Dec. 11, 1934.    J. GANZ    1,984,015
PEDAL ARRANGEMENT FOR VEHICLES
Filed Oct. 18, 1932
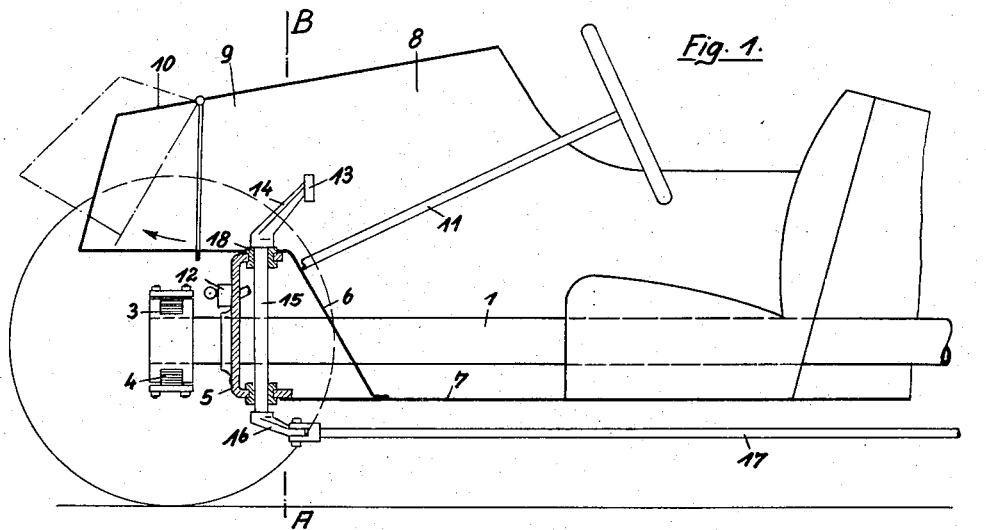
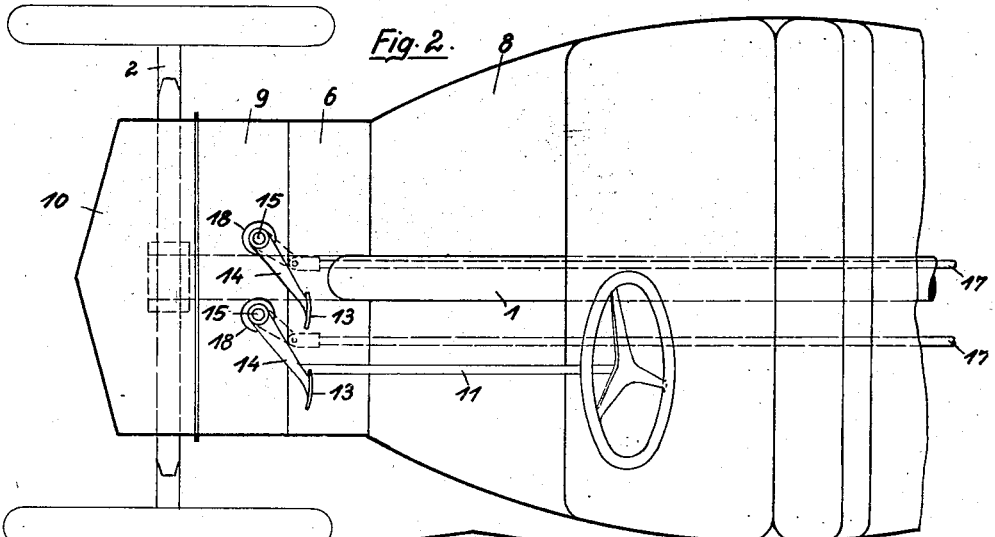
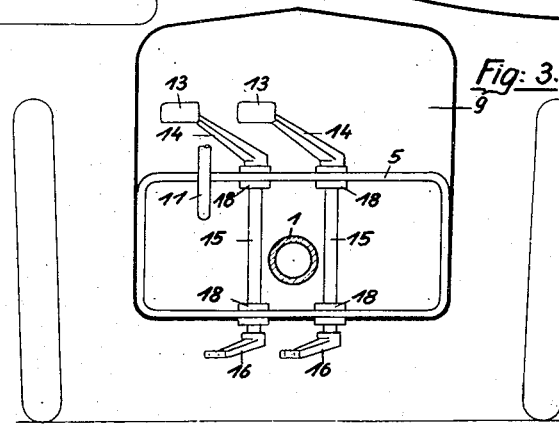
INVENTOR
JOSEPH GANZ
BY
ATTORNEY Patented Dec. 11, 1934

1,984,015

UNITED STATES PATENT OFFICE 1,984,015

PEDAL ARRANGEMENT FOR VEHICLES

Joseph Ganz, Frankfort-on-the-Main, Germany

Application October 18, 1932, Serial No. 638,339
In Germany October 21, 1931

3 Claims. (Cl. 180—77)

The present invention relates to control pedals for vehicles and more particularly to control pedals for motor-driven vehicles like automobiles.

The primary object of the present invention is to provide a pedal arrangement or device for vehicles especially automobiles which is located in such region with respect to the floor board in the driver's compartment that the driver of the automobile or vehicle can rest his feet comfortably when not operating the pedal and can conveniently engage the pedal whenever desired.

It is another object of the invention to provide a pedal device for automobiles which is so constructed that it may pass through the floor-board in the driver's compartment of an automobile while preventing the passage of dirt, water, and wind from the road.

It is a further object of the invention to provide a pedal device for automobiles which is made of strong parts and strong construction.

Other objects and advantages of the invention will become apparent from the following description taken in conjunction with the drawing, in which Fig. 1 is a fragmentary side elevational view partly in section of an automobile embodying the present invention.

Fig. 2 is a plan view of Fig. 1.

Fig. 3 shows a sectional view taken on the line A—B of Fig. 1.

It is well known that in certain automobiles or vehicles, it has been extremely difficult to incorporate a pedal device which would possess all of the advantages and features of the present invention. Thus, for instance, small vehicles which have their engine located in the rear, which have a front axle located close to the footboard in the driver's compartment, which have a low floor frame, and which have a narrow wheel base, have proved troublesome when incorporating foot pedals for the driver. In an automobile having the latter construction, the room or space available for pedals and for resting the driver's feet has been very small, particularly when it is considered that a clearance has to be made for the turning of the front wheels and that the longitudinal frame member occupies a substantial space of the floor-board in the driver's compartment. In spite of the foregoing shortcomings and similar difficulties with vehicles in which the room provided for the driver's feet is limited in breadth, nevertheless, foot pedals embodying the present invention can be incorporated in vehicles to give satisfactory service and to provide a solution to the problem which has been confronting the art.

Generally speaking, the present invention contemplates a structure in automobiles in which the floor-board provided for the driver's feet is completely free from all mechanisms and the treadles of the pedals are located above the floor-board in a region at least higher than the height of the top of a driver's foot when resting on the floor-board and that the pedal levers are located beyond the front of the foot-board. It is preferred that such a structure be employed in which the pedals are mounted for rotary movement about substantially vertical axes and that the levers extend from the axes in a substantially horizontal direction at an oblique angle with respect to the front axle of the automobile. In the preferred embodiment of the invention, it has been found satisfactory to extend the floor-board horizontally beyond the pedal mounting and over the front axle of an automobile to provide an enclosed chamber or space which would join the body of the automobile. In this manner, a completely enclosed chamber or space can be formed about the foot pedals in front of the driver's seat of an automobile and the wall or partition constituting an extension of the foot-board can be used for mounting the pedals. By providing a stuffing box or a similar arrangement around the axles or the shafts of the pedals, it is possible to completely prevent dirt, water and wind from entering into the interior of the automobile. Of course, other arrangements similar to stuffing boxes can be employed.

The invention will now be described in conjunction with an automobile in which a longitudinal member is provided and in which the engine is located in the rear of the automobile. With this type of automobile, it is preferred to mount the pedals so that one connecting rod extending, say to the clutch, extends to the right of and alongside of said longitudinal member and the other connecting rod extending to, say the brake, alongside of and to the right of the longitudinal member. In both instances, the connecting rods, which are actuated by the foot pedals, extend to mechanisms which are located in the rear of the automobile.

Referring more particularly to Fig. 1, the reference character 1 designates the longitudinal structure member which extends from the front to the rear of the automobile in the middle thereof. Mounted on the front of the longitudinal member is a front axle 2. Between the top of the longitudinal member and the front axle is a plurality of leaf-springs 3 while between the bottom of the longitudinal member and the front axle is a plurality of leaf springs 4.

Located just behind the front axle a pedestal or mounting 5 is provided for pedals and is preferably arranged in the form of a rectangle and secured to longitudinal number 1 in any customary manner. Extending downwardly at an angle from the top of mounting 5 is a foot-board 6 which engages floor-board 7 at the bottom thereof. The foot-board, floor-board and body of the automobile define a space wherein a foot-chamber 8 is located. Above the foot room is a recess 9 formed by the body of the car which encloses the space for the pedals and which is covered by a hood 10. This hood may be opened as shown by the dotted lines in Fig. 1 as those skilled in the art will readily understand, whereby entry may be gained for the adjustment of the pedals etc. In passing, it is to be noted that the reference character 11 designates a steering shaft, rod or post, and reference character 12 designates the cross-steering member.

A pair of pedals 13 are carried by levers 14. These levers are mounted at the top of shafts 15. It is to be noted that the shafts 15 are herein shown as held in mounting 5 in substantially a vertical position. At the bottom of each shaft a lever 16 is provided which is secured to a connecting rod 17. The shafts are provided with a bearing 18 at the top and the bottom thereof. This bearing serves as a mounting for the shaft and as a stuffing box. In the present instance, it will be observed that one of the connecting rods extends alongside of and to the right of the longitudinal member whereas the other connecting rod extends alongside of and to the left of the connecting rod.

It is to be observed that the present invention provides a pedal device which fulfills all the requirements of the situation and which can be used particularly with an automobile having a limited foot-board and an engine located in the rear thereof.

It is to be observed that the pedals embodying the present invention are principally in a straight line with the legs and with the feet. By this arrangement the driver can use all his force in treading on the foot-pedals.

Furthermore, the pedals with their tread, lever, etc. are mounted in a region which is high enough to be out of the way of the top of a driver's foot while at the same time the pedals are located in such a position as to be conveniently accessible to the driver's feet. In this connection, it is to be observed that the wall of the floor-board is free from all mechanisms and that the chamber surrounding the driver's feet is hermetically sealed from wind, rain and dirt.

Moreover, it is to be noted that the present invention provides a pedal in which it moves horizontally about a vertical axis and that the pedal does not collide with any structural element such as a cross-rod or the like.

What I claim is:—

1. A device of the character described comprising a chamber mounted at the front of an automobile, a foot-board in said chamber for supporting the feet of a driver, a wall extending from the top of said foot-board in a substantially horizontal direction, a shaft mounted substantially vertical to and passing through said horizontal wall, a stuffing box provided between said shaft and said wall to prevent the entry of rain, wind, dirt and the like, a lever connected with said shaft and extending at an oblique angle, and a pedal secured to said lever and located above the foot-board and in a position which is substantially in a straight line with the leg of a driver, said foot-board and said lever and associated parts being completely enclosed in said compartment.

2. A device of the character described comprising a chamber mounted at the front of an automobile, a foot-board in said chamber for supporting the feet of a driver, a wall extending from the top of said foot-board in a substantially horizontal direction, a shaft mounted substantially vertical to and passing through said horizontal wall, a stuffing box provided between said shaft and said wall to prevent the entry of rain, wind, dirt and the like, a lever connected with said shaft and extending at an oblique angle, and a pedal secured to said lever and located above the foot-board and in a position which is substantially in a straight line with the leg of a driver, said pedal and the wall supporting the same being higher than the height of the top edge of the foot-board whereby a foot-board is provided which is substantially free from the foot lever and the associated parts and is reserved for the feet of a driver.

3. A device of the character described comprising a compartment located at the front of an automobile having its upper part arranged to accommodate a foot pedal of an automobile and the bottom to accommodate a floor-board and a foot-board, a foot-board located at an angle, a wall extending from the top of said foot-board horizontally in a forward direction, a mounting located underneath said wall and said foot-board, a vertical shaft rotatively secured in said mounting, a stuffing box provided between said shaft and said wall, a lever extending obliquely from said shaft above said foot-board and a pedal associated with said lever and located in substantially a straight line with a leg of a driver, said pedal being arranged at a height above the foot-board and adapted to move in the front part of the aforesaid compartment.

JOSEPH GANZ.